United States Patent
Choi et al.

(10) Patent No.: US 7,799,460 B2
(45) Date of Patent: *Sep. 21, 2010

(54) NEGATIVE ELECTRODE ACTIVE MATERIAL FOR LITHIUM-BASED SECONDARY BATTERY AND METHOD OF PREPARING SAME

(75) Inventors: Wan-uk Choi, Chomam (KR); Jae-Yul Ryu, Suwon-si (KR); Sang-Young Yoon, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1056 days.

This patent is subject to a terminal disclaimer.

(21) Appl. No.: 10/391,335

(22) Filed: Mar. 17, 2003

(65) Prior Publication Data

US 2003/0175591 A1 Sep. 18, 2003

Related U.S. Application Data

(63) Continuation of application No. 09/792,305, filed on Feb. 23, 2001, now Pat. No. 7,662,513, which is a continuation of application No. 09/143,271, filed on Aug. 28, 1998, now Pat. No. 6,245,460.

(30) Foreign Application Priority Data

Aug. 28, 1997 (KR) .................................. 97-41937

(51) Int. Cl.
H01M 4/58 (2010.01)
H01M 4/60 (2010.01)
H01M 4/62 (2010.01)
H01M 4/02 (2010.01)

(52) U.S. Cl. .................... 429/231.8; 429/217; 429/209; 429/212

(58) Field of Classification Search ............. 429/231.4, 429/231.8, 217, 209, 212; 423/445 R
See application file for complete search history.

(56) References Cited

U.S. PATENT DOCUMENTS

| 4,968,527 A | 11/1990 | Yoshimoto et al. |
| 5,153,082 A | 10/1992 | Ogino et al. |
| 5,340,670 A | 8/1994 | Takami et al. |
| 5,344,724 A * | 9/1994 | Ozaki et al. ................. 429/94 |
| 5,426,006 A * | 6/1995 | Delnick et al. .............. 429/221 |
| 5,436,092 A | 7/1995 | Ohtsuka et al. |

(Continued)

FOREIGN PATENT DOCUMENTS

JP 05-307958 11/1993

(Continued)

OTHER PUBLICATIONS

Cullity, B.D. Elements of X-Ray Diffraction. 2nd Edition. Addison-Wesley Publishing Co., Inc. 1978. 401.*

*Primary Examiner*—Helen O Conley
(74) *Attorney, Agent, or Firm*—Christie, Parker & Hale, LLP

(57) ABSTRACT

A negative electrode active material for a lithium-based secondary battery includes a crystalline artificial graphite having an intensity ratio I(110)/I(002) of an X-ray diffraction peak intensity I(002) at a (002) plane to an X-ray diffraction peak intensity I(110) at a (110) plane of less than 0.2.

12 Claims, 1 Drawing Sheet

U.S. PATENT DOCUMENTS 5,686,138 A * 11/1997 Fujimoto et al. ............ 429/326
5,910,383 A * 6/1999 Hase et al. ................ 429/231.4
6,139,990 A * 10/2000 Kubota et al. ............ 429/231.8
6,344,296 B1 * 2/2002 Ishii et al. ................. 429/231.8

FOREIGN PATENT DOCUMENTS

| | | |
|---|---|---|
| JP | 06-318459 | 11/1994 |
| JP | 07 073868 A | 3/1995 |
| JP | 07073868 A * | 3/1995 |
| JP | 06-047006 | 6/1995 |
| JP | 07-169458 | 7/1995 |
| JP | 06-297047 | 10/1995 |
| JP | 07-296814 | 11/1995 |
| JP | 07-320722 | 12/1995 |
| JP | 08-012705 | 9/1996 |
| JP | 10-226505 | 8/1998 |

* cited by examiner

NEGATIVE ELECTRODE ACTIVE MATERIAL FOR LITHIUM-BASED SECONDARY BATTERY AND METHOD OF PREPARING SAME

CROSS REFERENCE TO RELATED APPLICATION

This application is a continuation of application Ser. No. 09/792,305, filed Feb. 23, 2001 now U.S. Pat. No. 7,662,513, which is a continuation of application Ser. No. 09/143,271, filed Aug. 28, 1998 now U.S. Pat. No. 6,245,460, which claims priority to Korean application No. 97-41937, filed Aug. 28, 1997, the contents of which are incorporated herein by reference.

BACKGROUND OF THE INVENTION (a) Field of the Invention

The present invention relates to a negative electrode active material for a lithium-based secondary battery and a method of preparing the same and, more particularly, to a negative electrode active material useful for fabricating a lithium-based secondary battery having a high capacity.

(b) Description of the Related Art

In recent years, the development of miniaturized portable electronics provokes needs for a secondary battery having a high capacity as well as a light weight. From the viewpoint of the capacity improvement per unit weight, a lithium-based secondary battery is preferably adopted because lithium has a high standard potential as well as a low electrochemical equivalent weight.

FIG. 2 is a schematic cross sectional view showing the general structure of the lithium-based secondary battery. As shown in FIG. 2, the lithium-based secondary battery includes a positive electrode plate 40 having a collector 1 made of nickel and an active material layer 10 coated on the collector 1, a negative electrode plate 45 having a collector 1' made of copper and an active material layer 30 coated on the collector 1', and a separator 25 interposed between the positive and negative electrode plates 40 and 45. The positive and negative electrode plates 40 and 45 essentially form an electrode plate assembly together with the separator 25. The electrode plate assembly is inserted into an opening portion of a battery case 5 internally surrounded with a gasket 20 while receiving an electrolyte 15 therein. The opening portion of the battery case 5 is covered by a cap 35.

Lithium-containing transition metal oxides such as $LiCoO_2$, $LiNiO_2$, $LiMn_2O_4$ and $LiNi_xCo_{1-x}O_y$ are preferably selected for the positive electrode active materials in conjunction with a polyethylene-based porous film for the separator.

As for the negative electrode active materials, lithium metal is attractive because it has a light weight and high capacity per unit weight to thereby output high voltage in the battery use. However, the use of lithium metal for the negative electrode material reveals serious defects in a cycle life and stability of the battery because the lithium metal is highly reactive with the electrolytic solvent and easily forms needle dentrites during cycling, causing destruction of the separator and a short circuit. In order to avoid the defects, lithium alloys are employed as the negative electrode active material instead of the lithium metal, but yet reveals similar problems.

Alternatively, carbon materials, which can reversibly accept and donate significant amounts of lithium without affecting their mechanical and electrical properties, are proposed for the negative electrode active material.

The carbon materials adapted for use in a battery are generally amorphous carbon materials and crystalline carbon materials.

When an amorphous carbon material is used for the negative electrode, the charge and discharge capacity is high but irreversible reactions are frequently generated and flatness in output voltage is poor compared to the crystalline carbon material. On the contrary, when a crystalline carbon material is used for the negative electrode, flatness in output voltage as well as the cycle life is good and the discharge/charge efficiency is high. But, the charge and discharge capacity is poor compared to the use of an amorphous carbon material. Among them, a crystalline carbon material, i.e., a graphite-like carbon material, has been preferably adopted for the negative electrode active material and attempts have been made to increase its charge and discharge capacity.

Meanwhile, even the graphite-like carbon material has only a partial crystalline structure or a complicated structure of crystalline portions and amorphous portions.

Therefore, U.S. Pat. No. 5,436,092 discloses a technique for controlling the ratio of crystallinity by separating the X-ray diffraction peaks at the (002) plane and the (10) plane, being a combination of (100) plane and (101), into a crystalline component and an amorphous component.

Furthermore, U.S. Pat. No. 5,340,670 discloses a technique of controlling the intensity ratio I(101)/I(100) of the X-ray diffraction peak at the (100) plane to the X-ray diffraction peak at the (101) plane.

In the meantime, U.S. Pat. No. 5,344,724 discloses a technique of controlling the graphitization degree of the graphite-like carbon material.

However, the aforementioned techniques do not satisfactorily improve the charge and discharge capacity of the graphite-like carbon material.

SUMMARY OF THE INVENTION

It is an object of the present invention to provide a negative electrode active material useful for fabricating a lithium-based secondary battery having a high capacity.

In order to achieve this object and others, the present invention provides a negative electrode active material including a crystalline artificial graphite having an intensity ratio I(110)/I(002) of an X-ray diffraction peak intensity I(002) at a (002) plane to an X-ray diffraction peak intensity I(110) at a (110) plane of less than 0.2.

A method for preparing an negative electrode active material for a lithium-based secondary battery includes the steps of dissolving a coal tar pitch or a petroleum pitch in an organic solvent to remove insoluble components therefrom, removing the solvent from the resulting material, heat-treating the pitch at a temperature in the range of 400 to 450° C. for 30 minutes or more under an inert atmosphere to thereby produce mesophase particles, stabilizing or coking the mesophase particles, carbonizing the stabilized or coked mesophase particles at a temperature in the range of 1,000 to 1,300° C., and graphitizing the carbonized mesophase particles at a temperature in the range of 2,500 to 3,000° C. to thereby form a graphite-like carbon material.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
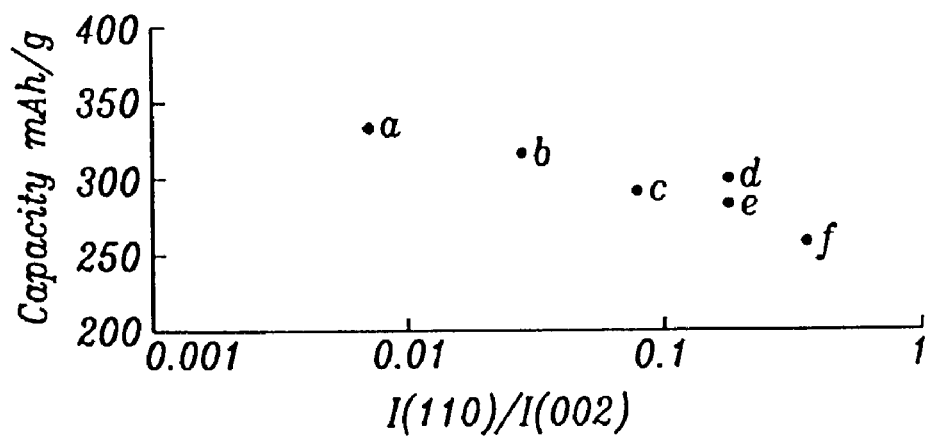
FIG. 1 is a graph showing variation in capacity of negative electrode active materials as a function of I(110)/I(002)
Figure 2:
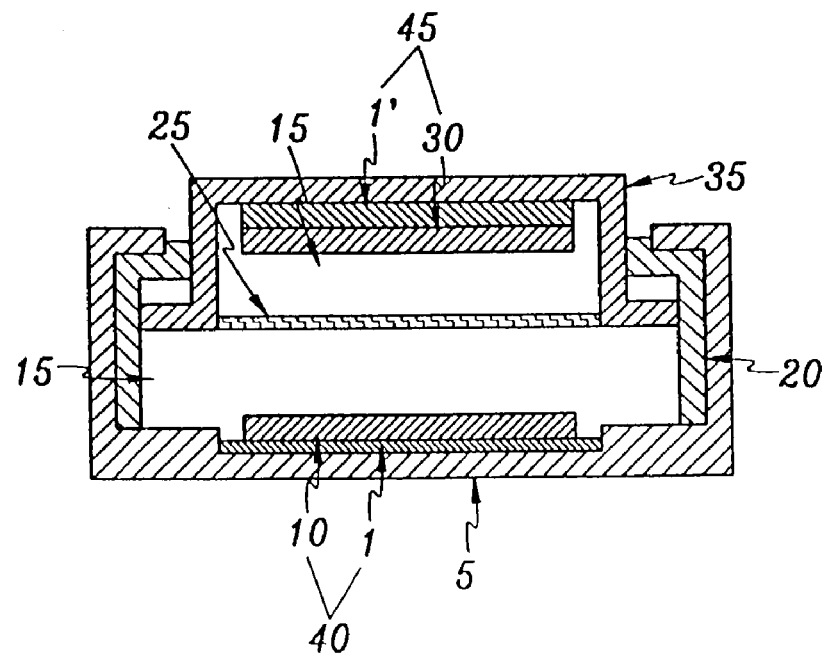
FIG. 2 is a schematic diagram of a 2016 typed coin cell.

The present invention is directed to a negative electrode active material for a lithium-based secondary battery. The negative electrode active material for the lithium-based secondary battery according to the present invention includes crystalline artificial graphite that has an intensity ratio I(110)/I(002) of an X-ray diffraction peak intensity I(002) at a (002) plane to an X-ray diffraction peak intensity I(110) at a (110) plane of less than 0.2.

The crystalline artificial graphite preferably has an intensity ratio I(110)/I(002) of less than 0.2, more preferably less than 0.04, still more preferably from 0.002 to 0.2, and even more preferably from 0.002 to 0.04. If the intensity ratio of the (002) plane to the (110) plane is out of this range, the capcity decreases. The intensity ratio is an integrated ratio that is obtained from calculating areas of peak.

A method for preparing the negative electrode active material includes the steps of dissolving a coal tar pitch or a petroleum pitch in an organic solvent to remove insoluble components therefrom, removing the solvent from the resultant product by evaporation or other means, heat-treating the pitch at a temperature in the range of 400 to 450° C. for 30 minutes or more under an inert atmosphere to thereby produce small spherical particles having an optical anisotropy (referred to hereinafter more simply as mesophase particles), stabilizing or coking the mesophase particles, carbonizing the stabilized or coked mesophase particles at a temperature in the range of 1,000 to 1,300° C., and graphitizing the carbonized mesophase particles at a temperature in the range of 2,500 to 3,000° C. to thereby form a graphite-like carbon material.

In the above method, the inert atmosphere is preferably a gaseous nitrogen or argon atmosphere and the mesophase particles are produced in a yield of 10~98 weight percent of the weight of the pitch.

The stabilizing step is preferably performed at a temperature that is 20 to 30° C. higher than the softening point of the mesophase particles. When the stabilizing step is performed at temperatures exceeding 30° C. higher than the softening point of the mesophase particles, the structure or component of the produced mesophase particles changes and entanglement among the particles occurs. On the contrary, when the stabilizing step is performed at a temperature less than 20° C. higher than the softening point of the mesophase particles, deterioration in stabilizing efficiency results.

The coking step is preferably performed at a rising temperature up to 600° C. under an inert atmosphere.

The carbonizing step is preferably performed at temperature ranging from 1,000 to 1,300° C. The carbonizing step is to remove components such as H, N and O from the stabilized or coked material. The components are not well removed at temperatures lower than 1,000° C. On the other hand, when the carbonizing step is performed at temperatures exceeding 1,300° C., a fine structure is significantly developed, causing reduction in the charge and discharge capacity.

The graphitizing step is preferably performed at a temperature ranging from 2,500 to 3,000° C. The graphitizing step is to arrange the fine structure of the carbonized material. When the graphitizing step is performed at temperatures below 2,500° C., the crystalline structure is not well developed and amorphous portions may be present. On the other hand, when the graphitizing step is performed at temperatures exceeding 3,000° C., the value of I(110)/I(002) greatly increases and the charge and discharge capacity is undesirably low.

In the present invention, the crystalline artificial graphite having a high capacity is prepared by comparing an integral intensity I(002) of the X-ray diffraction peak at the (002) plane with an integral intensity I(110) of the X-ray diffraction peak at the prismatic plane (110). That is, the main point of the present invention is posed on the twist of carbon atoms in an unit lattice of the crystalline structure, rather than on the contributing effect to the electric capacity by separating the crystalline portion and the amorphous portion. Furthermore, when the value of I(110)/I(002) is low, the identical effect can be obtained irrespective of crystallinity. The crystalline artificial graphite negative active material of the present invention has a crystal size in the direction of the c axis (Lc) of 10~100 nm and in the direction of the a axis (La) of 20~200 nm, and a specific surface of 3~20 m²/g.

The fine structure of the synthesized carbon material is changed in accordance with the preparing conditions and reveals difference to a natural graphite. The experimental tests exhibited that the lower the intensity ratio of the (002) plane to the (110) plane, which reveal a crystallinity during X-ray diffraction analysis, the higher the capacity of the graphite-like carbon material. Therefore, a lithium secondary battery having a high capacity can be fabricated with a graphite-like carbon material having a low intensity ratio of the (002) plane to the (110) plane for the negative electrode active material.

The present invention will be now described with reference to Examples and drawings.

Example 1

A coal tar pitch was dissolved in tetrahydrofuran (THF) and insoluble components were removed therefrom. The residual components were heat-treated at 430° C. for 2 hours under a gaseous nitrogen atmosphere to thereby produce 10 weight percent of mesophase particles based on the pitch. Thereafter, the produced mesophase particles were further heat-treated at 250~300° C. for 2 hours in air to stabilize them. The stabilized mesophase particles were then carbonized at 1,000° C. under a gaseous nitrogen atmosphere. Next, the carbonized mesophase particles were graphitized at 2800° C. for 30 minutes under an inert atmosphere such as gaseous nitrogen/argon atmosphere. As a result, a crystalline artificial graphite negative active material was prepared.

Example 2

A petroleum pitch was dissolved in THF and insoluble components were removed therefrom. The residual components were heat-treated at 430° C. for 2 hours under a gaseous nitrogen atmosphere to thereby produce 10 weight percent of mesophase particles based on the pitch. Thereafter, the produced mesophase particles were heated at a rising temperature up to 600° C. under a gaseous nitrogen atmosphere to thereby coke them. The coked mesophase particles were then carbonized at 1,800° C. under a gaseous nitrogen atmosphere. Next, the carbonized mesophase particles were graphitized at 2800° C. for 30 minutes under an inert atmosphere such as gaseous nitrogen/argon atmosphere. As a result, a crystalline artificial graphite negative active material was prepared.

Example 3

A coal tar pitch was dissolved in THF and insoluble components were removed therefrom. The residual components were heat-treated at 430° C. for 15 hours under a gaseous nitrogen atmosphere to thereby produce 98 weight percent of mesophase particles based on the pitch. Thereafter, the produced mesophase particles were further heat-treated at 250~300° C. for 2 hours in air to stabilize them. The stabilized mesophase particles were then carbonized at 1,000° C. under a gaseous nitrogen atmosphere. Next, the carbonized mesophase particles were graphitized at 2800° C. for 30 minutes under an inert atmosphere such as gaseous nitrogen/argon atmosphere. As a result, a crystalline artificial graphite negative active material was prepared.

Example 4

A petroleum pitch was dissolved in THF and insoluble components were removed therefrom. The residual components were heat-treated at 430° C. for 15 hours under a gaseous nitrogen atmosphere to thereby produce 98 weight percent of mesophase particles based on the pitch. Thereafter, the produced mesophase particles were heated at a rising temperature up to 600° C. under a gaseous nitrogen atmosphere to coke them. The coked mesophase particles were then carbonized at 1,000° C. under a gaseous nitrogen atmosphere. Next, the carbonized mesophase particles were graphitized at 2800° C. for 30 minutes under an inert atmosphere such as gaseous nitrogen/argon atmosphere. As a result, a crystalline artificial graphite negative active material was prepared.

Example 5

A coal tar pitch was dissolved in THF and insoluble components were removed therefrom. The residual components were heat-treated at 430° C. for 15 hours under a gaseous nitrogen atmosphere to thereby produce 98 weight percent of mesophase particles based on the pitch. Thereafter, the produced mesophase particles were heated at a rising temperature up to 600° C. under a gaseous nitrogen atmosphere to coke them. The coked mesophase particles were then carbonized at 1,100° C. under a gaseous nitrogen atmosphere. Next, the carbonized mesophase particles were graphitized at 2800° C. for 30 minutes under an inert atmosphere such as gaseous nitrogen/argon atmosphere. As a result, a crystalline artificial graphite negative active material was prepared.

Comparative Example 1

A coal tar pitch was dissolved in THF and insoluble components were removed therefrom. The residual components were heat-treated at 430° C. for a long time exceeding 15 hours under a gaseous nitrogen atmosphere to thereby produce mesophase particles. Thereafter, the produced mesophase particles were further heat-treated at 250~300° C. for 2 hours in air to stabilize them. The stabilized mesophase particles were then carbonized at 1,500° C. under a gaseous nitrogen atmosphere. Next, the carbonized mesophase particles were graphitized at 2800° C. for 30 minutes under an inert atmosphere such as gaseous nitrogen/argon atmosphere. As a result, a carbon material having a graphite structure was prepared.

Comparative Example 2

A coal tar pitch was dissolved in THF and insoluble components were removed therefrom. The residual components were heat-treated at 430° C. for 15 hours under a gaseous nitrogen atmosphere to thereby produce 98 weight percent of mesophase particles based on the pitch. Thereafter, the produced mesophase particles were further heat-treated at 250~300° C. for 2 hours in air to stabilize them. The stabilized mesophase particles were then carbonized at 1,000° C. under a gaseous nitrogen atmosphere. As a result, a carbon material having carbonized mesophase particles were prepared.

In Comparative Example 1, the graphite-like carbon material revealed a significantly high value of the intensity ratio I(110)/I(002) so that the capacity of the battery made using the carbon material become greatly lower. Furthermore, in the comparative example 2, the carbon material did not present a peak of the (110) plane and the capacity of the battery made using the carbon material turned out to be significantly low.

Each of the negative active materials having a different intensity ratio I(110)/I(002), prepared according to the Examples 1 to 5 of the present invention and Comparative Example 1, was mixed with a solution of polyvinylidene fluoride (PVDF) in a N-methyl pyrrolidone (NMP) solvent to be thereby made into a slurry. Then, the slurry was coated on a collector made of copper foil to thereby form a negative electrode plate. Next, a lithium secondary cell was prepared using the negative electrode plate together with a counter electrode made of lithium metal foil and an electrolyte of $LiPF_6$ in an organic solvent.

The capacity of each cell was measured and the results are presented in FIG. 1. In the figure, the alphabetic symbols a to f orderly indicate capacity and intensity ratio I(110)/I(002) of lithium-based secondary cells according to Examples 4, 2, 3, 1 and 5, and Comparative Example 1, respectively. The intensity ratio I(110)/I(002) of the lithium half cells was measured on an X'pert pro X-ray diffractometer (Phillips Co.) using light having a wavelength of 1.546 Å (CuK α) along the (002) and (110). As can be seen from FIG. 1, the cell made using the graphite-like carbon material having an intensity ratio I(110)/I(002) of less than 0.2 reveals increases in charge/discharge capacity.

As described above, in the present invention, the graphite-like carbon material having an intensity ratio I(110)/I(002) of less than 0.2 is used as the negative electrode active material so that the lithium secondary battery having a high capacity can be fabricated. Furthermore, the battery capacity can be measured without complicate experiments by adopting the intensity ratio I(110)/I(002) as the capacity criterion for the negative electrode active material.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A negative active material for a lithium-based secondary battery comprising a crystalline artificial graphite having an intensity ratio I(110)/I(002) of an X-ray diffraction peak intensity I(002) at a (002) plane to an X-ray diffraction peak intensity I(110) at a (110) plane ranging from about 0.002 to about 0.04.

2. The negative active material for a lithium-based secondary battery according to claim 1, wherein the crystalline artificial graphite has a crystal size in the direction of the c axis (Lc) ranging from 10 to 100 nm.

3. The negative active material for a lithium-based secondary battery according to claim 1, wherein the crystalline artificial graphite has a crystal size in the direction of the a axis (La) ranging from 20 to 200 nm.

4. The negative active material for a lithium-based secondary battery according to claim 1, wherein the crystalline artificial graphite has a specific surface ranging from 3 to 20 $m^2/g$.

5. The negative active material for a lithium-based secondary battery according to claim 1, wherein the intensity ratio is an integrated intensity.

6. A negative active material for a lithium-based secondary battery comprising a crystalline artificial graphite having an intensity ratio I(110)/I(002) of an X-ray diffraction peak intensity I(002) at a (002) plane to an X-ray diffraction peak intensity I(110) at a (110) plane ranging from about 0.002 to about 0.04, wherein the negative active material is made from a process comprising:

dissolving a coal tar pitch or a petroleum pitch in an organic solvent to remove insoluble components therefrom;

removing the solvent from the resulting pitch;

heat-treating the pitch at a temperature ranging from 400 to 450° C. for 30 minutes or more under an inert atmosphere to thereby produce mesophase particles;

stabilizing or coking the mesophase particles;

carbonizing the stabilized or coked mesophase particles at a temperature ranging from 1,000 to 1,300° C.; and graphitizing the carbonized mesophase particles at a temperature ranging from 2,500 to 3,000° C. to thereby form a crystalline artificial graphite.

7. The negative active material for a lithium-based secondary battery according to claim 6, wherein the step of dissolving a pitch selected from the group consisting of coal tar pitches and petroleum pitches in an organic solvent to remove insoluble components therefrom is performed prior to the step of heat-treating the pitch at a temperature ranging from 400 to 450° C. for 30 minutes or more under an inert atmosphere to thereby produce mesophase particles.

8. The negative active material for a lithium-based secondary battery according to claim 6, wherein the intensity ratio is an integrated intensity.

9. The negative active material for a lithium-based secondary battery according to claim 6, wherein the inert atmosphere is a gaseous nitrogen or argon atmosphere.

10. The negative active material for a lithium-based secondary battery according to claim 6, wherein the mesophase particles are produced in a yield of 10 to 98 weight percent based on the weight of the pitch.

11. The negative active material for a lithium-based secondary battery according to claim 6, wherein the stabilizing step is performed at a temperature that is 20 to 30° C. higher than the softening point of the mesophase particles.

12. The negative active material for a lithium-based secondary battery according to claim 6, wherein the coking step is performed at a rising temperature up to 600° C. under an inert atmosphere.

* * * * *